United States Patent
Monaghan et al.

(10) Patent No.: US 6,840,441 B2
(45) Date of Patent: Jan. 11, 2005

(54) SELF-SERVICE TERMINAL

(75) Inventors: Andrew Monaghan, Dundee (GB); John G. Savage, Fife (GB); Mark M. Grossi, Dundee (GB)

(73) Assignee: NCR Corporation, Dayton, OH (US)

( * ) Notice: Subject to any disclaimer, the term of this patent is extended or adjusted under 35 U.S.C. 154(b) by 52 days.

(21) Appl. No.: 09/951,986

(22) Filed: Sep. 11, 2001

(65) Prior Publication Data

US 2002/0036231 A1 Mar. 28, 2002

(30) Foreign Application Priority Data

Sep. 25, 2000 (GB) ............................................. 0023462

(51) Int. Cl.[7] .............................................. G06F 17/60
(52) U.S. Cl. .................... 235/379; 235/380; 235/381; 235/383; 235/375; 705/14
(58) Field of Search ................................. 235/379, 380, 235/381, 375, 383; 705/14; 345/867

(56) References Cited

U.S. PATENT DOCUMENTS

| | | | |
|---|---|---|---|
| 5,734,823 A | | 3/1998 | Saigh et al. ........... 345/200.06 |
| 6,084,583 A | * | 7/2000 | Gerszberg et al. .......... 345/867 |
| 6,189,783 B1 | * | 2/2001 | Motomiya et al. .......... 235/375 |
| 6,199,754 B1 | * | 3/2001 | Epstein ...................... 235/379 |
| 6,457,640 B2 | * | 10/2002 | Ramachandran et al. ... 235/379 |

FOREIGN PATENT DOCUMENTS

| | | |
|---|---|---|
| EP | 0535630 | 4/1993 |
| EP | 0899675 | 3/1999 |
| GB | 2341744 | 3/2000 |
| WO | 9309490 | 5/1993 |
| WO | 0013150 | 3/2000 |

* cited by examiner

*Primary Examiner*—Steven S. Paik
(74) *Attorney, Agent, or Firm*—Gregory A. Welte

(57) ABSTRACT

A self-service terminal (14) having a port (78) for transferring data is described. The terminal (14) includes a program (94) for informing a user about one or more electronic collectables (100) that a user can request, and for transferring a requested electronic collectable (100) to the user. The electronic collectables (100) typically comprise an image (104), an associated description (106) of the image, and file format information (102). A portable device (24) for accessing such a terminal (14) is also described. The device (24) comprises a program (50) for receiving a transferred electronic collectable (100) and for presenting at least part of the transferred electronic collectable so that a user of the device (24) can view an image and text portion of an electronic collectable (100) downloaded from the terminal (14).

9 Claims, 10 Drawing Sheets

SELF-SERVICE TERMINAL

BACKGROUND OF THE INVENTION

The present invention relates to a self-service terminal (SST), and to an SST system for distributing data. The invention also relates to a portable device for accessing an SST, and to a program for executing on such an SST.

SSTs are public access devices that typically provide users with access to services in an unattended environment.

SSTs are typically interconnected by a network that covers a relatively large geographical area. This makes SST networks ideal for distributing information and other data.

SUMMARY OF THE INVENTION

According to a first aspect of the present invention there is provided a self-service terminal having a port for transferring data, characterized in that the terminal includes a collectables management program for informing a user about one or more electronic collectables that a user can request, and for transferring a requested electronic collectable to the user.

The word "collectable" when used herein refers to data that represents one of a series of characters, icons, images, sounds, text, animations, or such like. One example of a collectable is an image of a famous film star. Another example of a collectable is a sound file excerpted from a song. Yet another example is a video clip from a newly-released film.

In a preferred embodiment, a collectable comprises an image (animated or still) and an associated description of the image. The description may be text-based or audio-based.

In one embodiment, the image relates to a character (real or fictitious), and the description relates to attributes (such as age, height, origin, preferences, or such like) of that character.

Preferably, the SST includes a plurality of collections, each collection comprising a series of associated collectables. For example, an SST may include three different collections, the first collection comprising rugby player collectables, the second collection comprising film star collectables, the third collection comprising video clip collectables. Thus, each film star collectable may contain a picture of a film star and a description of the most famous films in which that actor or actress appeared.

Each collectable in a collection preferably shares a common function, and/or a common brand, and/or a common 'look and feel'.

Each image in a collection may be mounted in a frame that is common to the images in that collection. Thus, when displayed, a collectable may have a similar appearance to traditional collectable cards, such as cigarette cards, and football cards. However, collectables are displayed, stored, and transferred electronically rather than physically, as for traditional cards.

Preferably, the port is a wireless port for wireless transfer of the collectables to the user. This enables a user to access the terminal using a portable device, such as a PDA (personal digital assistant), a cellular telephone, a games console, an Internet access device, a memory cartridge, or such like. The wireless port may be an infra red port (such as an IrDA-compliant port), a Bluetooth (trade mark) compliant port, or any other convenient port.

Alternatively, the port may be a cradle to allow a user's device (such as an MP3 player) to couple to the terminal to allow transfer of the collectable. The cradle may be provided in addition to the wireless port; that is, two ports may be provided, one wireless, the other a cradle.

Preferably, each collectable is a software file. The software file may allow interaction by a user; for example, the software file may be an applet. This is particularly advantageous when the collectable is a "pet" that responds differently according to how a user interacts with it.

Preferably, each collectable includes a file format information indicating the collection to which the collectable belongs. The file format information may include other information, such as how the stored data is to be represented (for example, if the data includes an image, how the image is to be displayed, if the data includes text, how much text there is), the date on which the collectable was downloaded, and such like.

The terminal may include a receiving program for receiving a collectable from a user's portable device, thereby allowing a user to trade a collectable with the terminal. The receiving program functionality may be incorporated into that of the collectables management program.

The terminal may include a timer for removing the collectables from the terminal (for example, by deleting them) after a predetermined period of time (for example, five days). This allows a collection to be provided for a predetermined time period.

The terminal may provide a remote host with details of the collectables distributed during a period, for example, during a day, a week, or such like. Such details may include the number and type of collectables distributed. These details may be provided in a similar way to the manner in which state of health information relating to the terminal is conveyed to the remote host. For example, the collectable distributed during a period may be reported in the same way as the amount of cash dispensed from the terminal during a particular time period.

The terminal may be an automated teller machine.

In some embodiments, each electronic collectable may have a purchase price, so that a self-service terminal sells collectables to users. In other embodiments, however, it is envisaged that electronic collectables are transferred to a user free of charge.

An SST may sell previous collections of collectables to a user.

By virtue of this aspect of the invention, users are encouraged to visit SSTs so that they can complete a collection of their chosen collectables. This provides an SST network with an added attraction for customers. While a user is at an SST additional services (for which the user pays) may be offered, thereby increasing the use of the SSTs and the revenue from the SSTs. As many SSTs include a full color display, and can be modified to include a wireless port, existing SSTs can be upgraded to distribute electronic collectables.

According to a second aspect of the invention there is provided a portable device for accessing a self-service terminal, the portable device including a port for receiving data, characterized in that the device further comprises a program for receiving a transferred electronic collectable, and for presenting at least part of the received collectable.

Where the electronic collectable includes a visual representation, the device may display the visual representation.

Where the electronic collectable comprises an animated and/or audible representation, the device may execute the animated and/or audible representation so that the user can watch and/or listen to it.

Preferably, the program displays a gallery of downloaded collectables. Conveniently, the collectables are grouped by the device into collections to which they relate. The device may read file format information indicating the group to which the collectable belongs to enable the device to group the electronic collectables correctly.

Preferably, the program is able to transfer each collectable to another portable device, thereby allowing users to trade collectables with each other.

According to a third aspect of the invention there is provided an electronic collectable for distribution from a self-service terminal, the collectable comprising a software file having file format information and an associated representation, where the file format information indicates a series to which the representation belongs.

Preferably, the electronic collectable further comprises a text-based description of the representation. Alternatively, or additionally, the electronic collectable may further comprise an audio description of the representation. The description may include attributes of any character (for example: gender, height, age, appearance, or such like) or object (for example, engine size, color, shape, or such like) shown in the representation.

Preferably, the file format information includes one or more of the following (in any combination): a title of the electronic collectable, an indication of the size of the title, image width information, image height information, color data for indicating the colors of each pixel in the collectible, an indication of the size of any text information associated with the collectable image, and the number of frames to be transmitted that relate to the current image type and resolution.

The representation may be an image, a sound clip, a video clip, text, or such like.

According to a fourth aspect of the invention there is provided a system for distributing electronic collectables, the system comprising a plurality of self-service terminals interconnected to a server; wherein the terminals are able to receive one or more collectables from the server so that a series of collectables can be centrally loaded on the server and distributed through each of the self-service terminals.

According to a fifth aspect of the invention there is provided a method of supplying a self-service terminal user with an electronic collectable, the method comprising the steps of: informing a user about one or more collectables that the user can request; receiving a request for a collectable from the user; advising the user to prepare to receive the requested collectable; and transferring the collectable to a portable device of the user.

The portable device may be held by the user. Alternatively, the portable device may be worn by the user.

The step of advising the user to prepare to receive the requested collectable may include advising the user to align a portable device with a port in the self-service terminal.

According to a sixth aspect of the invention there is provided a method of marketing an event, the method comprising the steps of: preparing a series of electronic collectables associated with the event, each collectable comprising a software file; storing the series of collectables in a system; and allowing users to download a collectable from the system.

The event may be the release of a new film, the release of a new musical record, a sporting event, a new product or service, or such like.

The method may comprise the further step of: generating rules relating to the number of collectables that a user may download during a time period. For example, each user may only be allowed to download a single collectable each day. This has the advantage that a user is attracted to the system each day to collect the entire series of collectables.

The method may comprise the further step of: setting a time limit during which the collectables may be collected. For example, the collectables may be removed from the system after one week. Alternatively or additionally, the method may comprise the step of: setting a limit to the number of electronic collectables that can be downloaded. For example, the collectables may be removed from the system after one thousand collectables have been downloaded. A limit to the number of electronic collectables that can be downloaded may be set for each geographic location of the self-service terminals.

The method may include the step of targeting users to whom electronic collectables will be offered. These may be the only users to whom the electronic collectables are offered. The targeted users may be frequent users of the SSTs.

According to a seventh aspect of the invention there is provided a program for executing on a portable terminal, the program being operable to receive an electronic collectable, and to present at least part of the electronic collectable on a display associated with the portable terminal.

BRIEF DESCRIPTION OF THE DRAWINGS

These and other aspects of the invention will be apparent from the following specific description, given by way of example, with reference to the accompanying drawings, in which.

DETAILED DESCRIPTION

Figure 1:
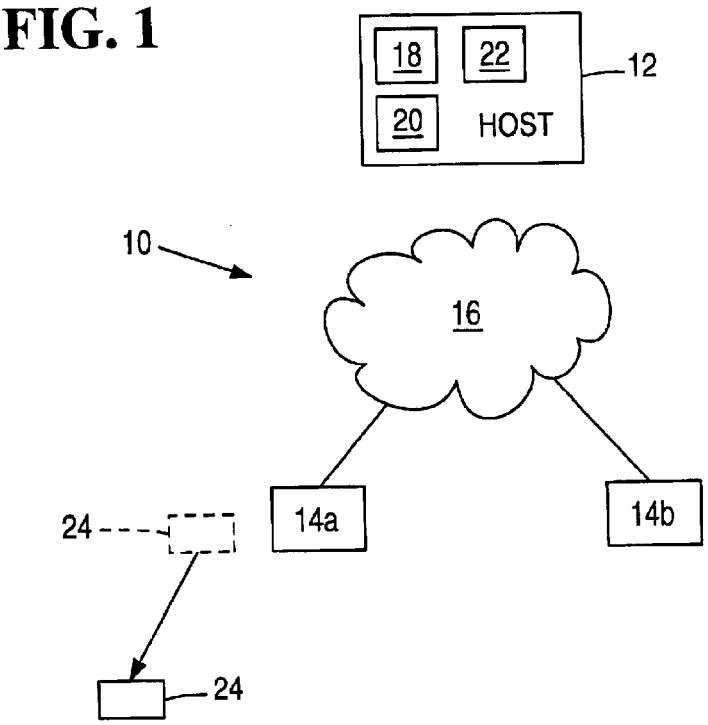
FIG. 1 is a block diagram of a self-service terminal system in accordance with one embodiment of the present invention.

Referring now to FIG. 1, which is a block diagram of a self-service terminal system 10 in accordance with one embodiment of the present invention, the system 10 comprises a host (server) 12 interconnected to a plurality of SSTs 14 (only two are shown) by a network 16. The SSTs 14 are in the form of ATMs. The host 12 includes an authorization facility 18, a back-office facility 20 and a software repository 22 for storing electronic collectable programs for distribution to ATMs 14 across the network 16.

In addition to authorizing ATM transactions, the host 12 operates as an interactive server from which ATMs 14 can download electronic collectables, as will be described in more detail hereinafter. The ATMs 14 are physically remote from each other, but are shown in proximity in FIG. 1 for clarity.

FIG. 1 also shows a portable device 24 in the form of a PDA, such as a 3Com PalmIIc (trade mark). The PDA 24 is shown in broken line adjacent to one of the ATMs 14a and in solid line further away from the ATM 14a to illustrate that the PDA 24 is typically presented to an ATM 14a and then used remotely from the ATM 14a.

Figure 2:
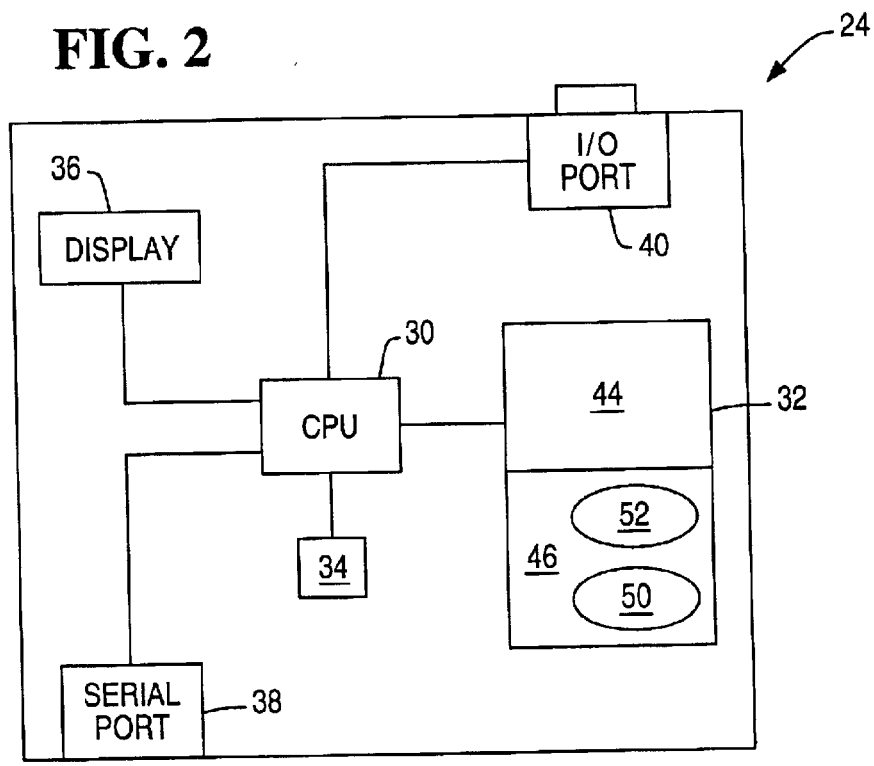
FIG. 2 is a block diagram illustrating the architecture of a portable device used in the system of FIG. 1.

Reference is now made to FIG. 2, which is a block diagram illustrating the architecture of the PDA 24 used in FIG. 1. In FIG. 2, the PDA 24 comprises a controller 30 and associated volatile memory 32 and non-volatile memory 34, a touch-sensitive display 36, a serial communication port 38 for receiving a communication cable, and a communication port 40 in the form of an IrDA-compliant infra-red port for wireless transmission and reception of data.

Data can be transmitted to and from the IR port 40 using high level commands because the PDA 24 includes the necessary drivers for effecting communication via port 40. In the 3-Com Palm IIIc (trade mark) software called "Exchange Manager" is used to effect communication via port 40. As a result, it is not necessary for a programmer to understand the underlying protocols and transmission characteristics involved for the programmer to be able to send and receive data using port 40.

The non-volatile memory 34 is FLASH EPROM and contains the BIOS for booting-up the PDA 24. The FLASH EPROM 34 also stores the applications that are pre-programmed into the PDA 24, such as a calendar application, a notepad application, and such like.

The volatile memory 32 is logically split into two parts: a dynamic heap 44 and a storage area 46.

The dynamic heap 44 is used for storing dynamic data such as global variables, system dynamic allocations (TCP/IP, IrDA, and such like), application stacks, and temporary memory allocations. The keystrokes entered into the PDA 24 are all stored in the dynamic heap 44. The dynamic heap 44 is cleared when the PDA 24 is reset.

The storage area 46 is used for data and application storage, and is analogous to disk storage in a desktop personal computer. The storage area 46 is powered by the PDA batteries (not shown) and by a large capacitor, so that the storage area 46 retains data even when the PDA 24 is reset or the batteries are replaced.

Storage area 46 is also loaded with an electronic collectables viewer program 50 for receiving and storing electronic collectables, and also for displaying the appropriate parts of electronic collectables. During use, the controller 30 also loads the storage area 46 with a simple operating system kernel 52.

Figure 3:
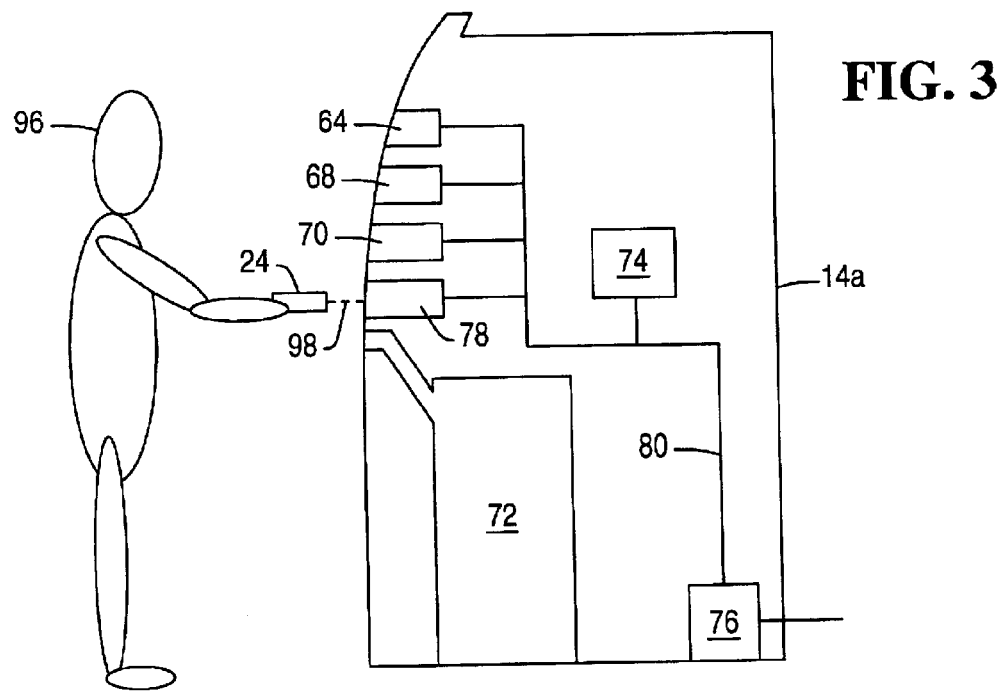
FIG. 3 is a block diagram showing an ATM of FIG. 1 in more detail.

Referring now to FIG. 3, which shows an ATM 14 of FIG. 1 in more detail, the ATM 14 includes a touchscreen display module 64, a magnetic card reader/writer (MCRW) module 68, a receipt printer module 70, a cash dispenser module 72, an ATM controller module 74 for controlling the operation of the various modules, a network connection module 76 for communicating with the host 12 (FIG. 1) via network 16 (FIG. 1), and an IR port module 78. All of the modules within the ATM 14 are interconnected by an internal bus 80 for conveying encrypted data.

The IR port module 78 includes an IR to electrical signal converter, and conforms to the IrDA standard for wireless communication of data.

Figure 4:
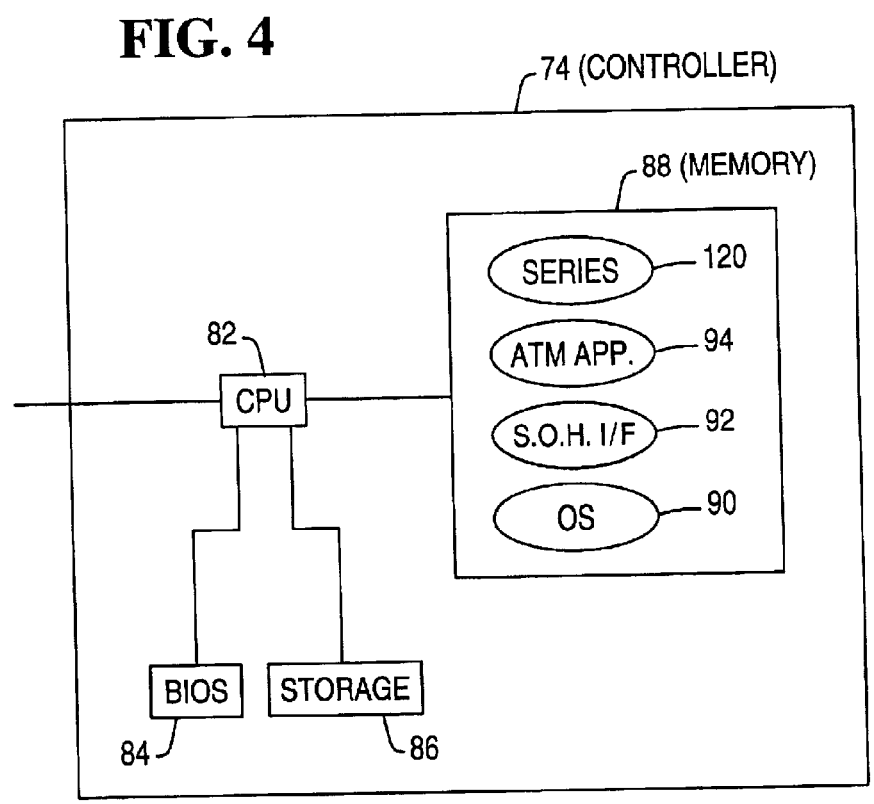
FIG. 4 is a block diagram showing part of the ATM of FIG. 3 in more detail.

Reference is now made to FIG. 4, which shows the ATM controller 74 in more detail. Controller 74 comprises a processor 82, a bios 84, storage 86 in the form of a magnetic disk drive, and main memory 88. In use, the processor 82 loads the memory 88 with an operating system kernel 90, a state of health management interface 92, and an ATM application 94.

The management interface 92 filters out state of health information received from the modules (64 to 72 in FIG. 3) to monitor the performance of these modules (64 to 72 in FIG. 3) and thereby to detect possible malfunctions. The management interface 92 may also include open system architecture components (such as WOSA and/or WOSA XFS) for providing application interoperability in calling functions relating to the modules (64 to 72 in FIG. 3).

The ATM application 94 includes routines required to manage receipt and distribution of electronic collectables. In particular, the ATM application 94 includes the application flow (i.e. the series of screens) presented to a user on the ATM display 64. The ATM application 94 also includes conventional routines that are required to instruct modules to perform functions, for example, to instruct the cash dispenser 72 to dispense twenty pounds sterling. The ATM application 94 also includes:

(1) a routine for receiving electronic collectables from the host 12 and storing them in the memory 88;

(2) a routine for sending electronic collectables to the IR port module 78 for transfer to a user; and (3) a routine for receiving electronic collectables from the IR port module 78, that is, electronic collectables sent by a user.

Figure 5:
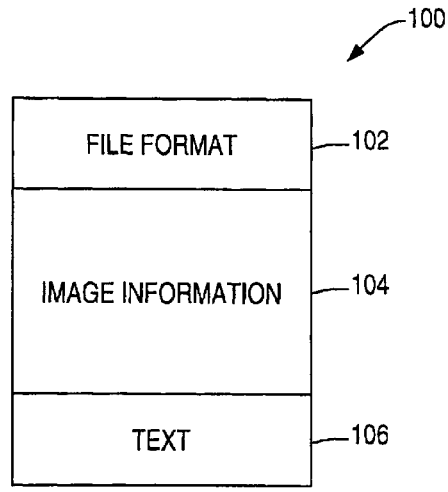
FIG. 5 illustrates the data structure of an electronic collectable.

An electronic collectable 100 will now be described with reference to FIG. 5. The collectable 100 is a software file comprising a file format field 102, a representation field 104, and a text description field 106.

The file format field 102 contains data relating to the title of the collectable, the image size (x and y directions), the group (or series) to which the collectable belongs, color information, and any animation data if the representation is an animated image.

The representation field 104 comprises bitmap format pixel data relating to an image.

The text description field 106 contains text describing the image. The text may also be in bitmap format.

When the owner or operator of the ATM network 10 (FIG. 1) wishes to market an event then a marketing campaign is initiated. The ATM owner or operator may provide this as a service to a third party and may charge the third party for this service.

The campaign involves creating electronic collectables relating to the event. In this embodiment, it is assumed that a new cinema film is to be released relating to fictitious characters called "Minimons". A series of collectables is devised including a number of these characters. In this embodiment, eight different characters are included in the series.

Figure 6:
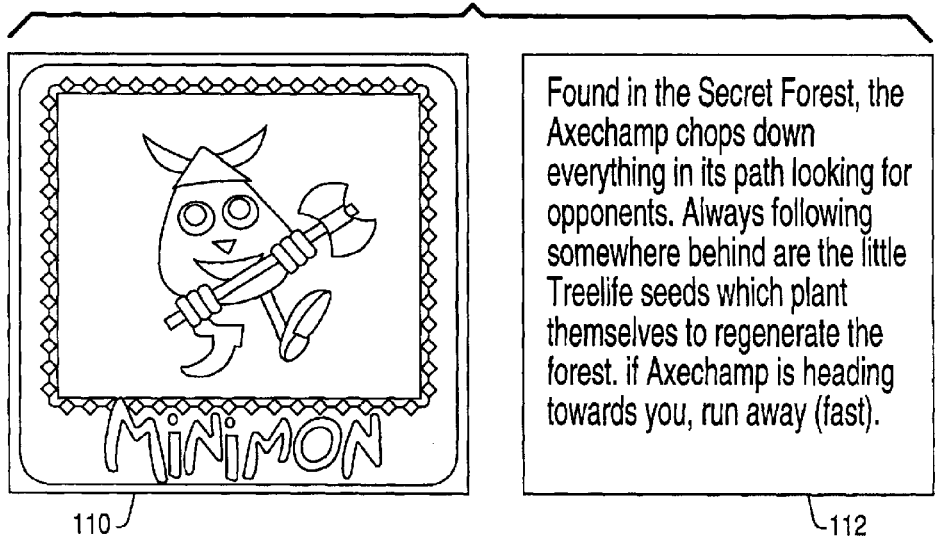
FIG. 6 illustrates a representation stored in an electronic collectable and the associated text description.

FIG. 6 illustrates the image 110 of one of these eight characters (called Axechamp) and the associated text description 112, as it might appear on a portable device, such as PDA 24 (FIGS. 1 and 2). The image 110 is shown displayed with a card background, however, the image 110 may be displayed without this background Although a person will typically associate the collectable with the image and text displayed, what is actually collected is the file (collectable) 100 containing the image, text, and format information.

Figure 7:
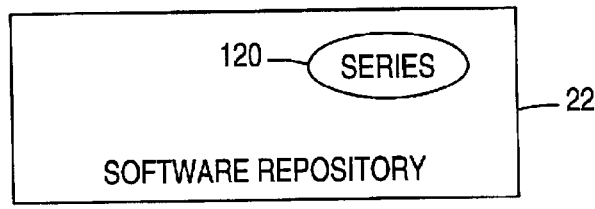
FIG. 7 illustrates part of the system of FIG. 1 that stores a series file containing electronic collectables.
Figure 8:
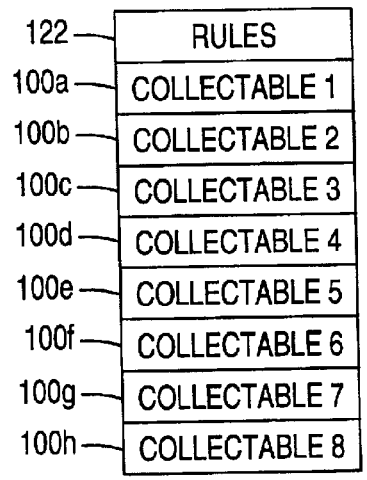
FIG. 8 illustrates the data structure of the series file of FIG. 7.

Referring to FIGS. 7 and 8, once a series of characters has been devised, and the image and text information for each character has been translated into a collectable file 100, the collectable files 100 are then combined into a series file 120, which is then loaded into the software repository 22 on host 12. The collectables 100 are provided with rules governing their transfer; these rules 122 are included in the series file 120, as illustrated in FIG. 8. For example, each collectable 100 may have a purchase price associated with it; or if it is free of charge, a user may only be allowed to download one collectable for each transaction executed.

The host 12 automatically transfers the series file 120 to each ATM 14. This is typically done during the night, or at some other time period when network traffic is low. If the series file 120 is an update to or a replacement for a series file that is currently stored on the ATMs 14, then the previous series file is automatically deleted by the ATM 14. Each ATM 14 stores the transferred series file 120 in the memory 88 (FIG. 4) of its ATM controller 74 (FIGS. 3 and 4).

When the ATM application 94 receives the series file 120, it splits the series file 120 into the individual collectables files 100a to h, and the rules file 122. The rules file 122 is then read to determine how the collectables files 100a to h are to be distributed by the ATM 14.

Referring to FIGS. 2, 3, and 9, if a user 96 wishes to download a collectable 100 to his/her PDA 24, then the user 96 approaches ATM 14a, inserts his/her magnetic stripe card into the MCRW module 68 via a slot in the ATM 14a, and enters a PIN (personal identification number).

The controller 74 then presents the user 96 with a screen 130 (FIG. 9a) on display module 64. The screen 130 allows a user to select either withdraw cash 132 or download a collectable 134. Most of the screens in the sequence of screens shown in FIG. 9 also provide an option 136 to allow a user to cancel the transaction.

If the user 96 selects the withdraw cash option 132 then a conventional ATM transaction is executed to provide the user 96 with cash. If the user 96 selects the download collectables option 134, then the next screen 140 (FIG. 9b) asks the user 96 to select the type of portable device (such as PDA 24) operated by the user 96. The types of portable devices supported by the ATM 14a are shown on this screen 140, each type having its own selectable option (142 to 148).

Once the user 96 has selected the correct PDA type, in this embodiment option 144 for PDA 24, then screen 150 (FIG. 9c) is presented on display 64.

Screen 150 asks the user 96 to select the collectables series from which the user wishes to select a collectable. Three series are shown on screen 150: Minimon 152, football players 154, and other 156 (which may include previous series that are still stored on the ATM 14).

Figure 9A:
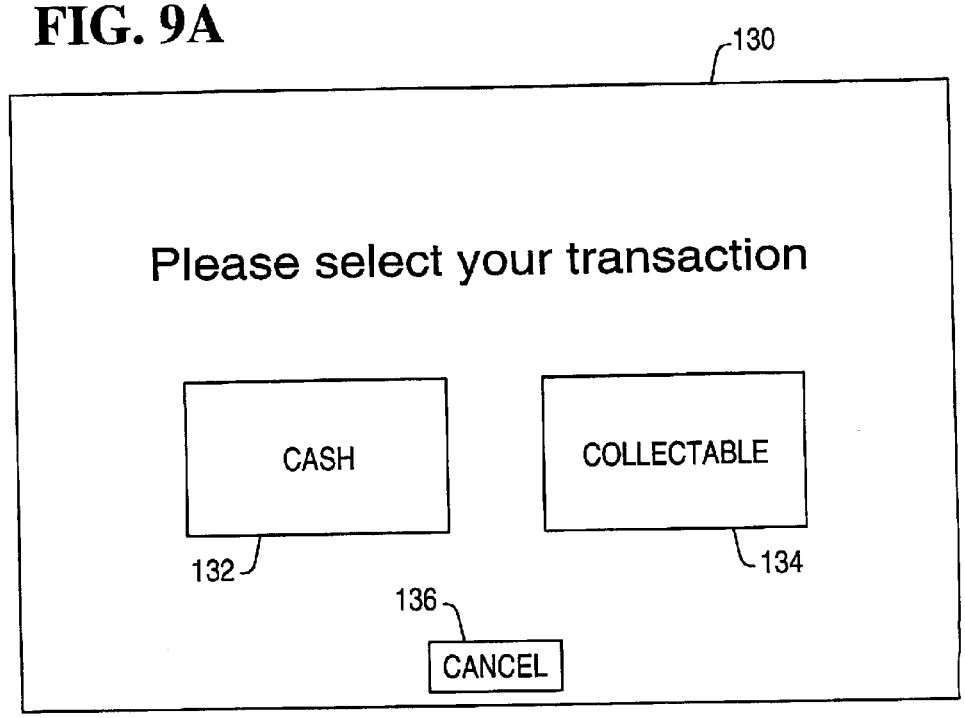
FIGS. 9a to 9f illustrate screens displayed on the ATM of FIG. 3 during a transaction where a user downloads an electronic collectable.
Figure 9B:
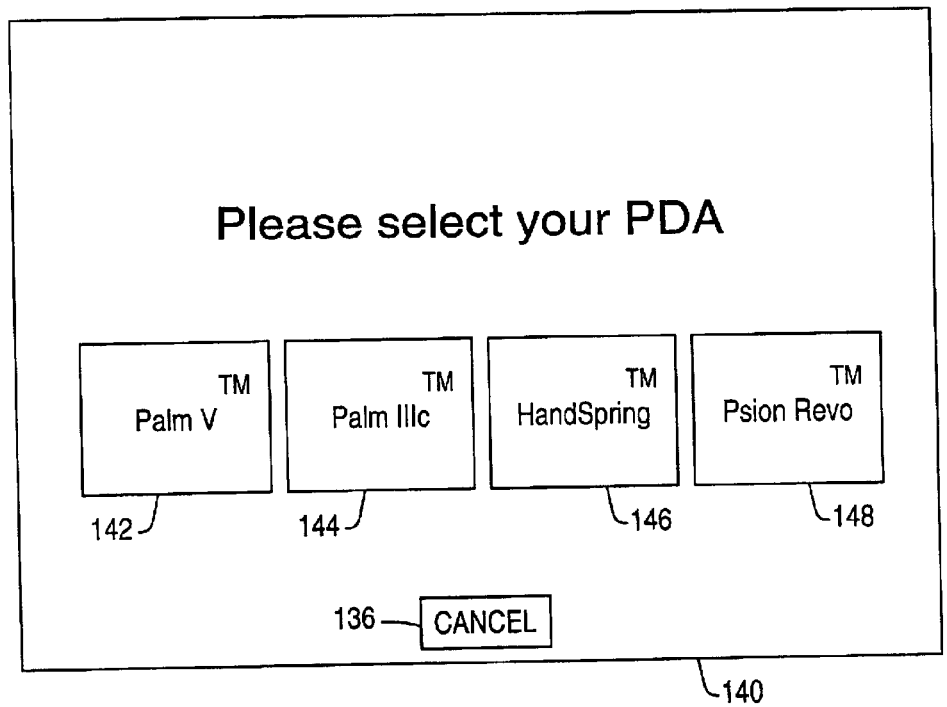
Figure 9C:
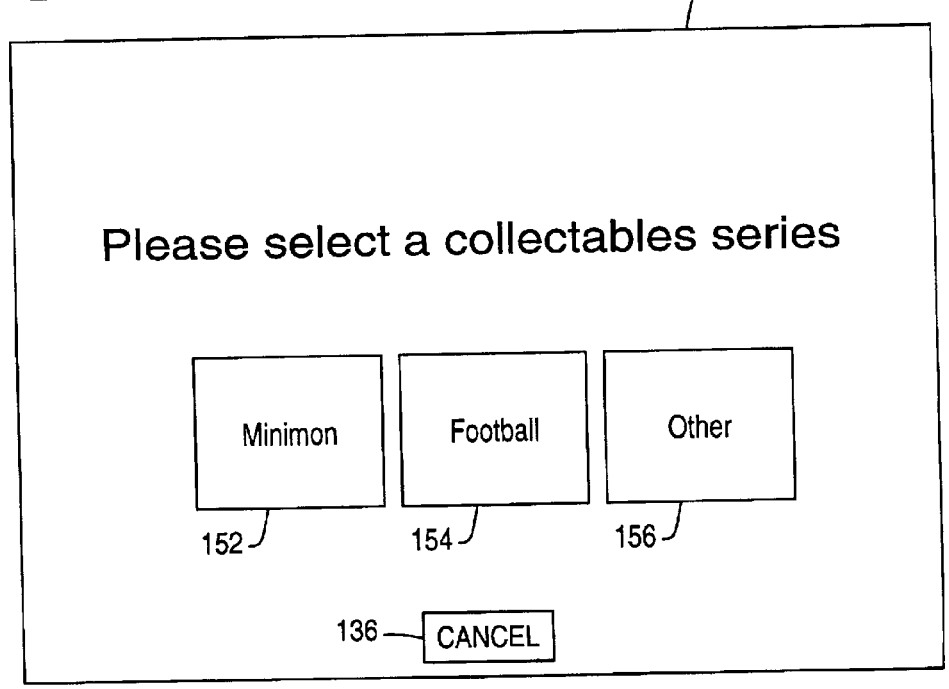
Figure 9D:
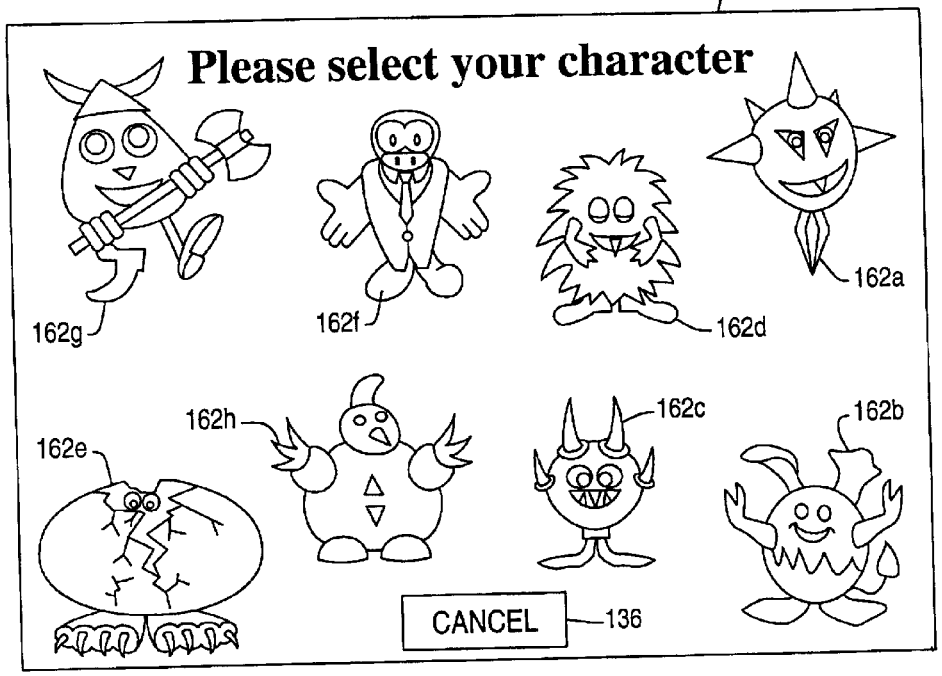
Figure 9E:
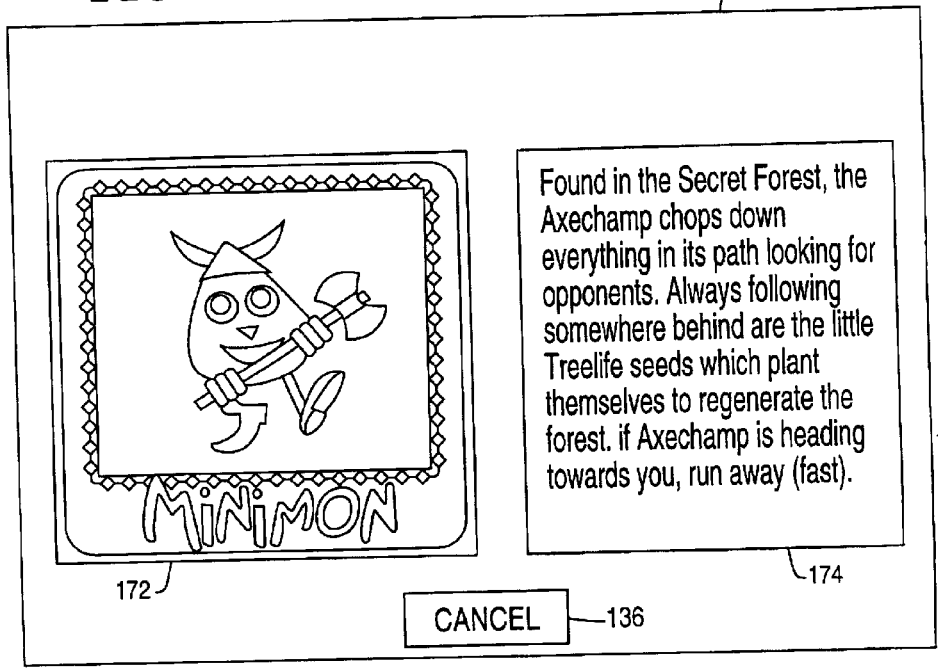

When the user 96 selects a series (in this embodiment the Minimon series is selected), then all the characters in that series are displayed on the next screen 160 (FIG. 9d). The characters 162a to 162h may be displayed as still images or as animations (for example, the characters may move up and down and/or across the screen 160). The user 96 is asked to touch the character 162 they wish to download.

When the user 96 has selected a character (for example, the character called "axechamp" 162g), then the card mounted image 172 and the associated description 174 (which may be considered analogous to the reverse side of the card) of the character 162g is displayed on the next screen 170 (FIG. 9e) to show how the collectable 100g will be displayed on the user's PDA 24.

Figure 9F:
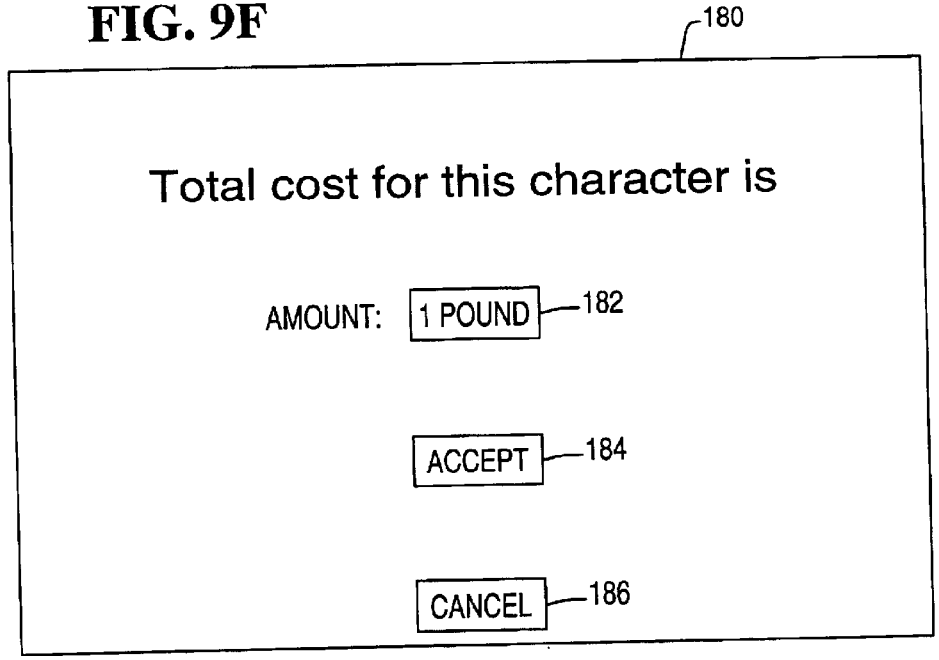

The user 96 is then informed of any cost associated with downloading the collectable (comprising this image 172 and description 174) on the next screen 180 (FIG. 9f). Screen 180 has a total cost field 182, an accept option 184 for confirming that the collectable 100g is to be bought, and a cancel option 136 for canceling the transaction. In other embodiments, there may be no cost associated with downloading a collectable, or the cost may be in points, such as loyalty points, rather than in cash.

Once the user 96 has accepted the offer by selecting accept option 184, the transaction is validated at the remote host 12 (FIG. 1) and a screen (not shown) is presented inviting the user 96 to align the PDA's wireless port 40 with the ATM's wireless port 78 so that the collectable can be transferred to the user 96, as illustrated by dotted line 98 in FIG. 3. If the download was successful, a screen (not shown) is presented informing the user 96 of the successful download. If the download was not successful, a screen (not shown) is presented informing the user 96 that the download failed and inviting the user 96 to realign the PDA 24 for another attempt. If the collectable 100g cannot be transferred successfully, then the transaction debiting money from the user's account is reversed or otherwise cancelled and the user 96 is informed that no money has been debited from his/her account.

Figure 10A:
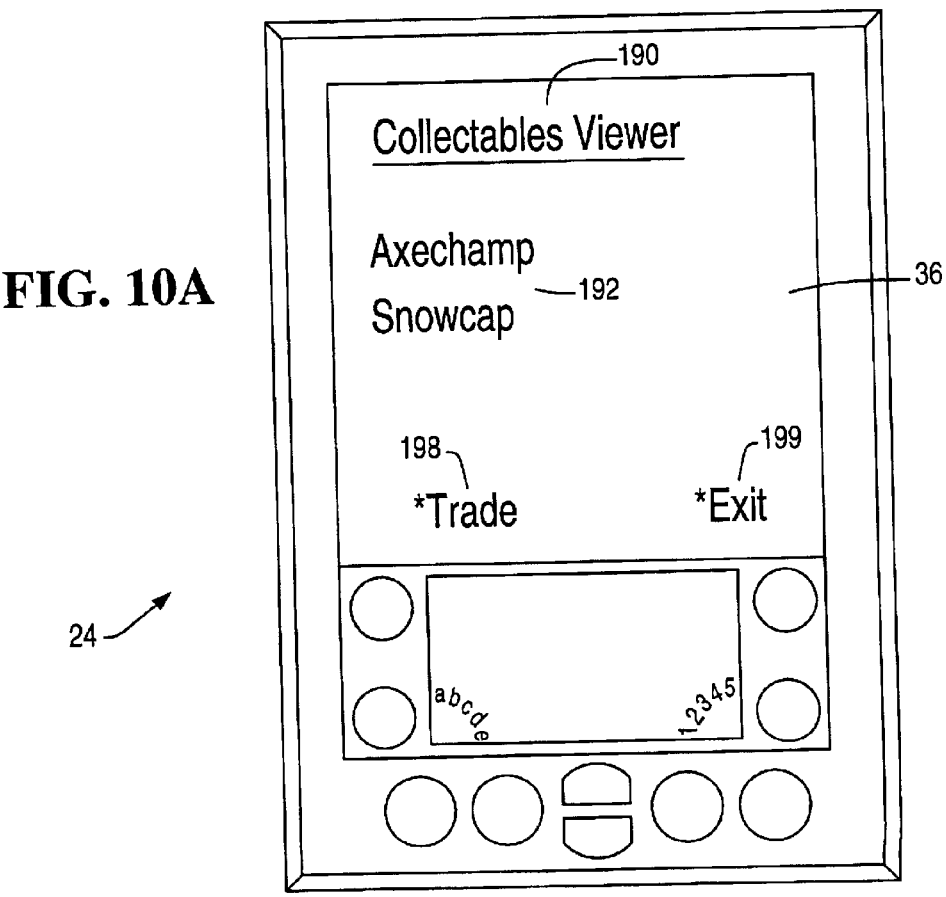
FIGS. 10a to 10c illustrate screens displayed on the portable device of FIG. 2 to a user after downloading an electronic collectable from the ATM of FIG. 3.
Figure 10B:
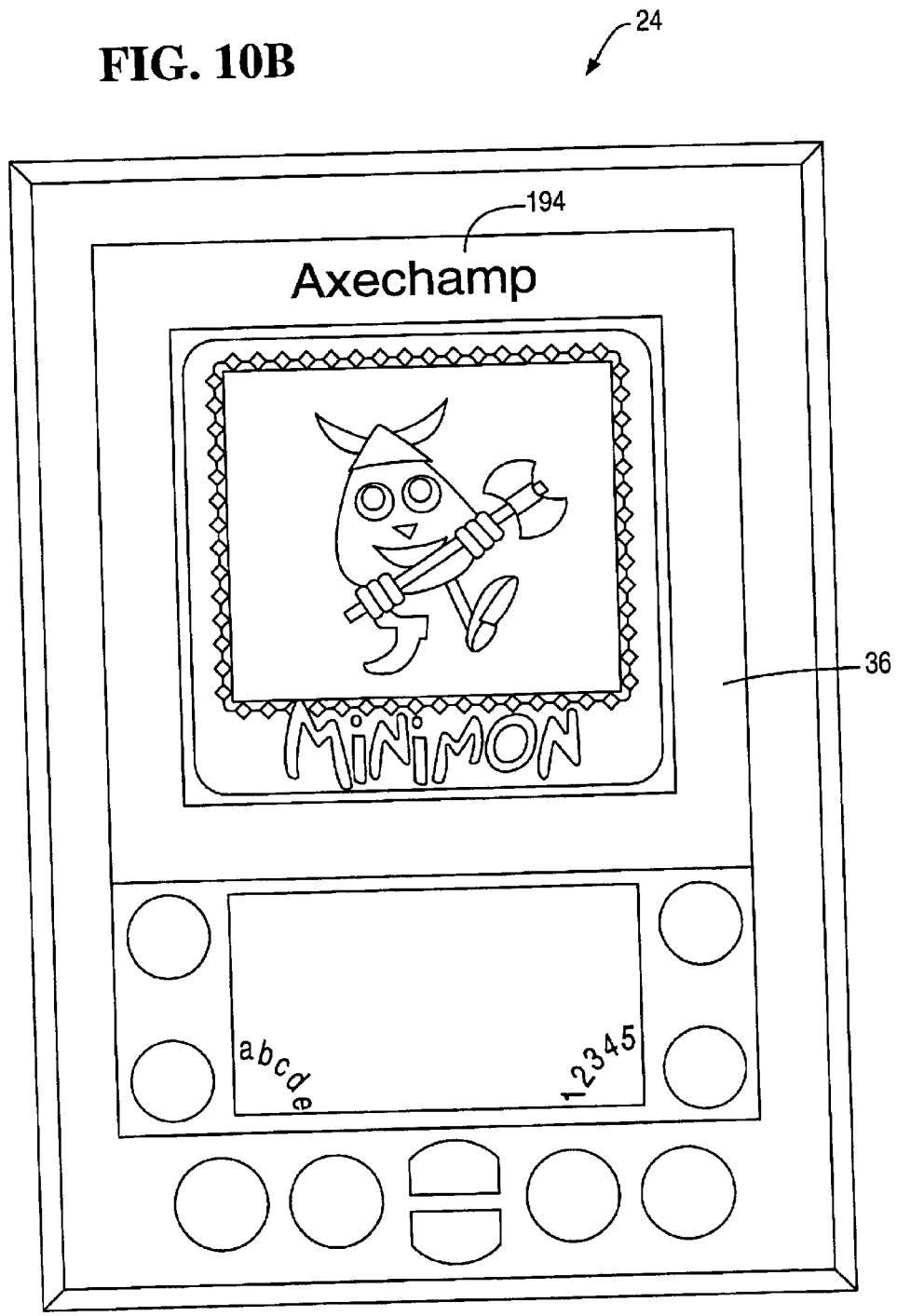
Figure 10C:
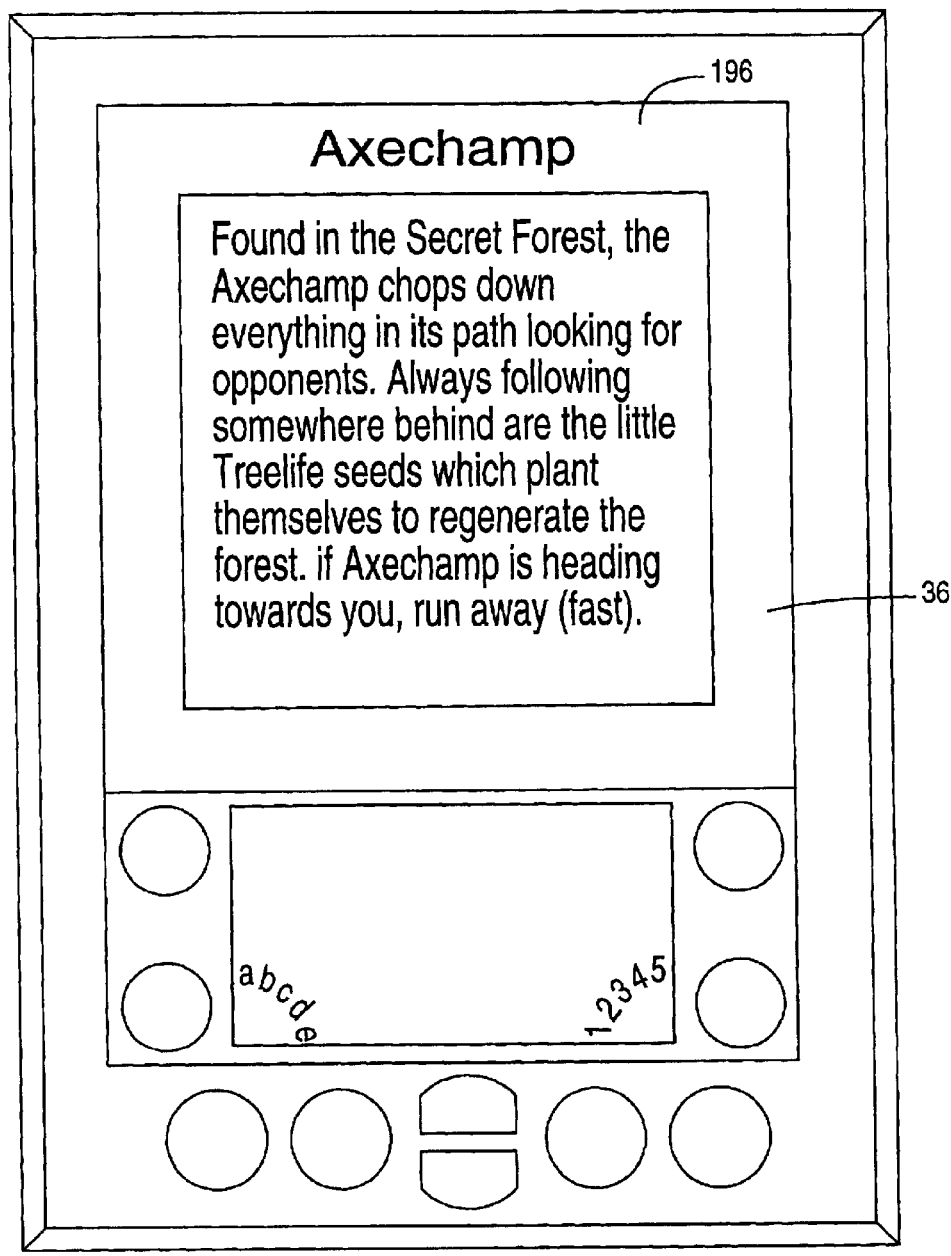

Referring to FIGS. 10, at some later time, the user 96 can view the collectable on his/her PDA 24. To do this, the user 96 launches the collectables viewer program 50 (FIG. 2). This program 50 presents a PDA screen 190 on the display 36. The screen 190 shows the collectables that are stored on the PDA 24 as names in a list 192, as illustrated in FIG. 10a. The user 96 can select one of these names and view the collectable image and description for that name, as illustrated in FIG. 10b (screen 194 showing the image) and FIG. 10c (screen 196 showing the description).

Where more than one series is stored on the PDA 24, the list may show the names of the series, such as Minimons, football players, and such like, so that the user has first to select the series, then another list is presented showing the collectables stored on the PDA 24 for that series.

The user 96 can also trade collectables with other users by using the viewer program 50, as illustrated in FIG. 10a, by selecting the trade option 198. This instructs the viewer program 50 to transmit the selected collectable via the wireless port 40 (FIG. 2). If another user has aligned his/her portable devices port with the user's PDA port 40 then the other user can receive the transferred collectable There may be some monetary payment involved in this transfer between portable devices.

Figure 11:
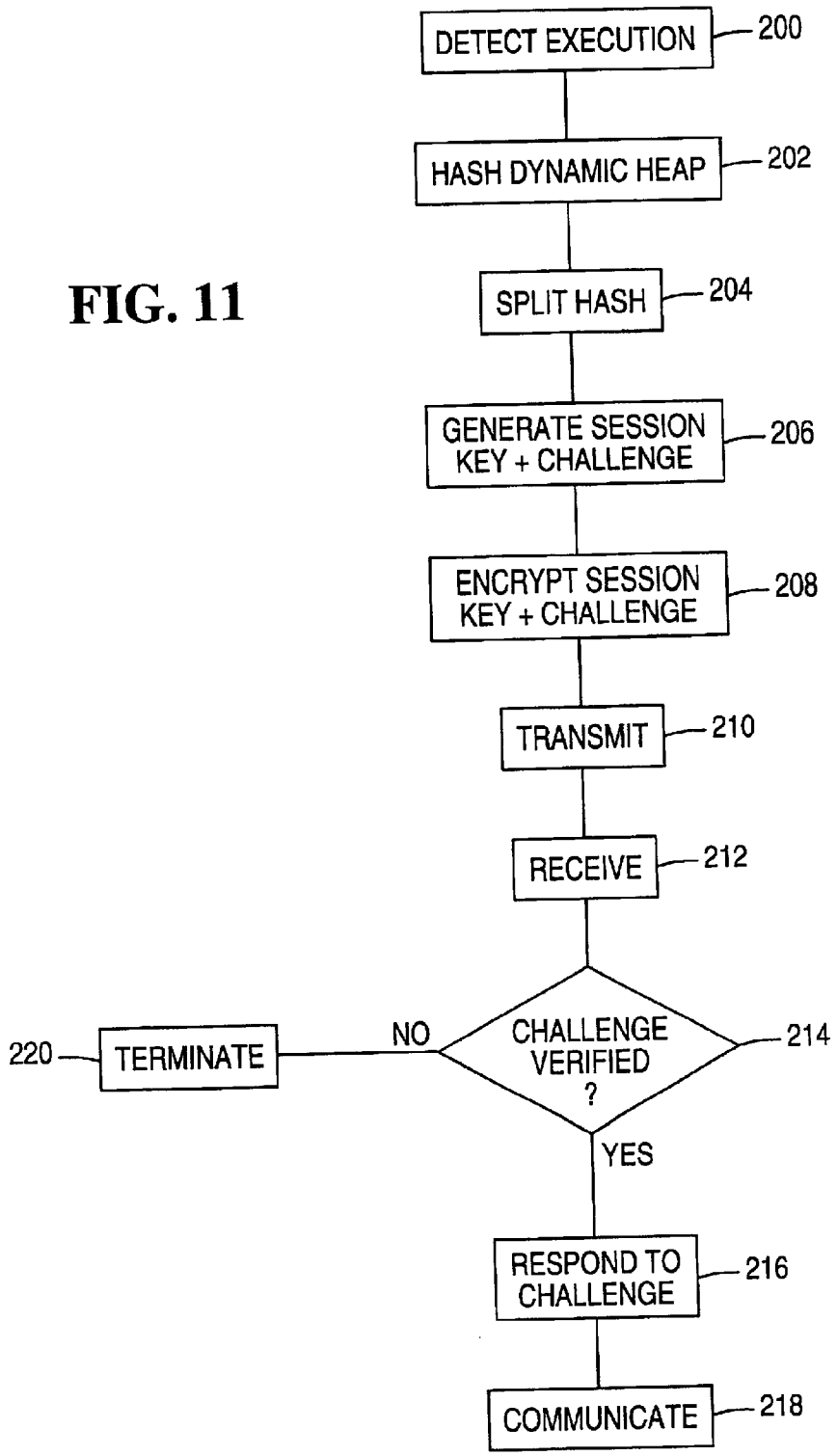
FIG. 11 is a flowchart illustrating the steps involved in encrypting an electronic collectable when transferring from an ATM to a portable device.

In other embodiments, a PDA may include an encryption program for implementing secure transfer of a collectable (as illustrated in FIG. 11). This encryption program generates a new key for each transaction (transfer of a collectable) by obtaining a seed, and then applying a hashing algorithm (step 202), in this embodiment MD5, to the seed. The seed is obtained by the encryption program reading the contents of the dynamic heap 44 (FIG. 2), requesting the current date and time from the operating system, and appending the date and time settings to the read contents. In some embodiments, only a portion of the dynamic heap 44 may be used, for example, several hundred bytes of the dynamic heap may be used.

The hashed value is then split into two halves (step 204): left and right. Two operations are then performed on the left half and the right half to generate a unique session key and a unique challenge value (step 206)

In the first operation, the left half is used as a first intermediate key and the right half is used as first intermediate data. The first intermediate key is used to encrypt the first intermediate data to produce the new key (which is a symmetric session key). In the second operation, the right half is used as a second intermediate key and the left half is used as second intermediate data. The second intermediate key is used to encrypt the second intermediate data to produce a challenge value. The intermediate keys and intermediate data are then discarded (they may be deleted or retained in memory until more memory is required). Thus, a unique key and a unique challenge value have been produced using the hashed value of the contents of the dynamic heap 44.

The PDA then uses a stored public key to encrypt the new key and challenge value (step 208). The encrypted key and challenge value are then transmitted (step 210) from the PDA to the ATM.

The ATM receives the encrypted transmission and conveys the transmission to an ATM controller, The controller decrypts (using the private key counterpart to the public key) the encrypted transmission to recover the new (unique) session key and challenge value. The controller responds to the original challenge value sent by the PDA and prepares a new challenge value. The controller conveys to the PDA the new challenge and the original challenge using the new session key to encrypt the transmission.

The PDA receives (step 212) the encrypted challenges and verifies (step 214) that the ATM has correctly responded to the original challenge.

If the ATM has correctly responded to the original challenge then the PDA responds to the ATMs challenge (step 216) and the ATM verifies this response; thereafter, secure communication can take place between the PDA and the ATM, and the prepared transaction (transfer of a collectable) can be executed (step 218).

If the ATM has not correctly responded to the original challenge, then the communication between the PDA and the ATM is terminated (step 220).

Various modifications may be made to the above described embodiment within the scope of the invention, for example, the portable device may be a device other than a PDA, for example, a cellular telephone, a portable PC (personal computer), a games console, or such like. In other embodiments, the SSTs may be information kiosks rather than ATMs. In other embodiments, the transaction flow (FIGS. 9a to 9f) may be different to that described; for example, no PIN may have to be entered, or a PIN may be entered after downloading an electronic collectable.

What is claimed is:

1. A method of operating a Self-Service Terminal, SST, comprising:

a) maintaining access to image-data representing visual images of subjects which include people or objects;

b) maintaining data representing a background A and a background B;

c) selecting image-data, and delivering the selected image-data to customers, wherein i) first data represents a first subject within a background A;

ii) second data represents a second subject within said background A;

iii) third data represents a third subject within a background B; and iv) fourth data represents a fourth subject within said background B.

2. Method according to claim 1, wherein the process of delivering the first and second data is limited to a selected time period surrounding a predetermined public event.

3. Method according to claim 1, and further comprising:

d) placing a limit on the number of times the first and second data are delivered.

4. Method according to claim 3, wherein said limit is imposed for a time period, and then said limit is modified.

5. Method according to claim 1, wherein the SST comprises an Automated Teller Machine, ATM.

6. Method according to claim 1, and further comprising:

d) when image-data is delivered, delivering additional data representing text which describes attributes of the subject represented by the image-data.

7. Method according to claim 1, wherein software, hardware, or both, prevent delivery of image-data to predetermined customers.

8. Method according to claim 1, and further comprising:

d) maintaining a list of conditions under which image-data is delivered, wherein different conditions apply delivery of the first data, compared with the third data.

9. Method according to claim 2, wherein the first and second data are available for delivery throughout said selected time period.

\* \* \* \* \*